United States Patent [19]

Häuser

[11] 4,307,760
[45] Dec. 29, 1981

[54] PRESSURE-REGULATED MOLD-FILLING APPARATUS FOR THERMOSETTING MATERIAL

[75] Inventor: Erhard Häuser, Schöffengrund, Fed. Rep. of Germany

[73] Assignee: Wilhelm Hedrich Vakuumanlagen GmbH & Co. KG, Katzenfurt, Fed. Rep. of Germany

[21] Appl. No.: 101,142

[22] Filed: Dec. 7, 1979

Related U.S. Application Data

[63] Continuation-in-part of Ser. No. 946,602, Sep. 28, 1978, abandoned.

[30] Foreign Application Priority Data

Nov. 3, 1977 [DE] Fed. Rep. of Germany ....... 2748982

[51] Int. Cl.³ .............................................. B65B 3/32
[52] U.S. Cl. ......................................... 141/82; 141/95; 141/196; 141/392; 222/55; 264/40.1; 417/43; 425/145
[58] Field of Search ................. 137/568; 141/1, 9, 99, 141/100, 105, 196, 392, 82, 95; 222/55; 264/40.1; 417/43; 425/145, 146, 542, 543, 555, 558, 559, 561, 572

[56] References Cited

U.S. PATENT DOCUMENTS 3,847,525 11/1974 Bielfeldt ............................ 425/555

*Primary Examiner*—Frederick R. Schmidt
*Attorney, Agent, or Firm*—Karl F. Ross

[57] ABSTRACT

Flowable thermosetting synthetic-resin material is fed to a plurality of pressurizable buffer compartments and then to a plurality of respective molds having differently dimensioned mold cavities. Each of these compartments is pressurized so as to maintain pressure on the molten material in the respective molds during the molding and curing operation, during which time the pumps that feed the material to the compartments may be stopped. Each of the buffer compartments has sensing means which operate the pumps of the system.

12 Claims, 4 Drawing Figures

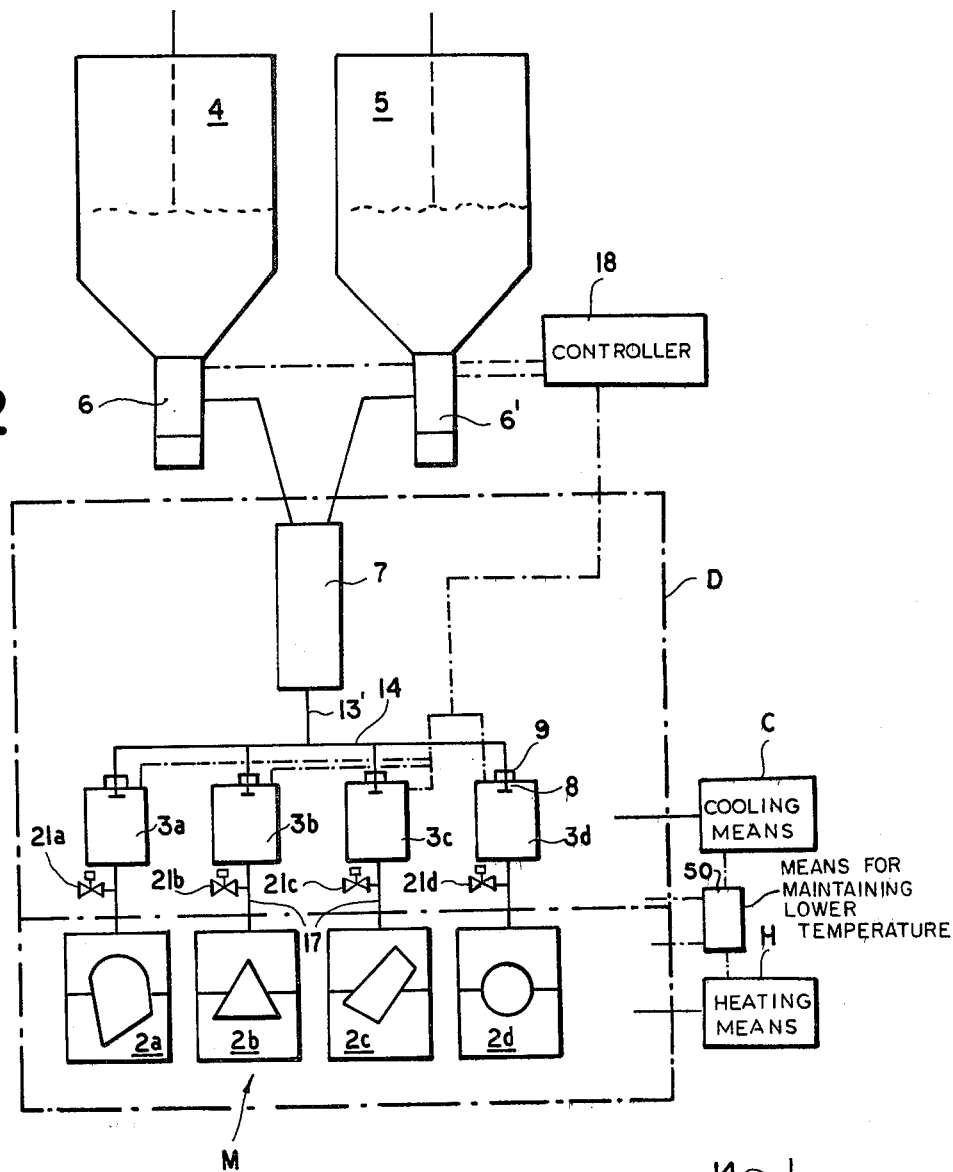
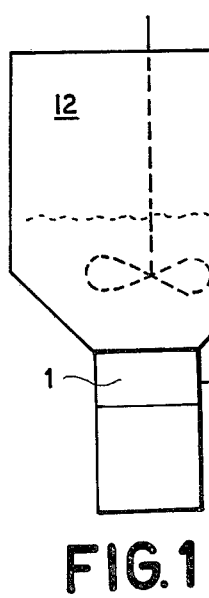

PRESSURE-REGULATED MOLD-FILLING APPARATUS FOR THERMOSETTING MATERIAL

CROSS REFERENCE TO RELATED APPLICATIONS

This application is a continuation-in-part of my copending application Ser. No. 946,602 filed Sept. 28, 1978 now abandoned and also relates to my copending application Ser. No. 938,011 of Aug. 30, 1978 now abandoned.

FIELD OF INVENTION

The present invention relates to a system for filling a mold. More particularly this invention concerns such a system for filling a plurality of molds having differently dimensioned mold cavities.

BACKGROUND OF THE INVENTION

The casting of articles such as electrical or electronic components that must have good insulating properties is normally carried out by means of a system having at least one mixing container, a dosing pump connected downstream thereto, a mixing chamber connected to the outlet of the pump, and a plurality of molds connected to this mixing chamber.

Reference may be had, in addition, to the references cited or made of record in the above-identified copending applications including U.S. Pat. Nos. 3,847,525 and 2,781,547; German Patent No. 1,272,524 and reissue U.S. Pat. No. Re 28 721 which may be material to the subject matter thereof and one of which is discussed in greater detail below.

In considering the background of the invention, a clear distinction should be made between the problems involved in dealing with the molding of thermoplastic synthetic resins, i.e. synthetic resins which harden by cooling and can be brought to a flowable state by heating, and those which involve thermosetting synthetic resins which are frequently referred to outside the United States as "duroplastics."

Synthetic resins of the latter type generally consist of two or more components which are intimately mixed prior to use and which react in a period referred to as the "pot life" to form a hardenable or hard mass which no longer is flowable.

Thermosetting resins include, for example, epoxy resins in which one component can include an epoxy compound while the other is an amine hardener and urethane-type compounds in which one component can be a prepolymer of characteristic composition and/or a di- or polyisocyanate while the other component can include diol or polyol compounds.

When thermosetting materials are handled, a significant danger is the setting or hardening of the mixture before the latter enters the mold. In other words if a portion of the mixture exceeds its pot life before entering the mold cavity, it will undergo reaction to set in portions of the apparatus upstream of the mold cavity.

The several components of the resin and its filler are normally kept in several respective containers in which they are premixed and wherein they may also be degassed by vacuum if necessary. The premixed components are fed by respective pumps in predetermined ratios to a single main mixing chamber through respective pressure-control valves having bypass lines that lead back to the premixing chambers or containers so that excess material can be fed back to these chambers. From the main mixing chamber the material is fed to the mold or molds.

The main disadvantage of this system is that the pressure with which the material is fed into the molds is the same for all of the molds, normally varying sharply pulse-wise. If all the molds do not have cavities of the same shape and volume, some of the cavities will fill up more rapidly than the others, or others will not be filled completely. Thus the pressurization must be maintained to fill even the largest cavities and compensate for resin shrinkage therein. What is more the recirculation of premixed material back to the storage chambers or containers can lead to clogging of the system if this material had had time to cure before it is recirculated.

In another known system synchronously operated pumps feed the various components from their storage vessels to a common mixing container, whence the mass is forced directly into the mold or molds. These pumps, which are well upstream of the mold, are therefore responsible for filling the mold and maintaining pressure therein during curing of the resin in the mold. As the gelling or hardening time inside the mold is at least several minutes long, these pumps must operate continuously to maintain the necessary pressure.

The result of such a system is premature wearing-out of the pumps.

OBJECT OF THE INVENTION

It is therefore an object of the instant invention to provide an improved system for filling one or more molds.

Another object is to provide such a system which overcomes the disadvantage of the above-given mold-filling system.

Another object is to provide such a system usable with the valve-type positive displacement pump of my copending application Ser. No. 938,011 now abandoned.

Yet another object of the invention is to provide a molding system specifically adapted to the problems of the handling of thermosetting materials whereby the disadvantages of earlier systems can be avoided and the danger of premature setting of the material before it enters the mold can be obviated.

Yet another object of this invention is to extend the principles of the applications mentioned previously, especially in solving problems arising with thermosetting materials.

Yet another object of this invention is to provide an apparatus which will allow distribution of thermosetting synthetic resins to a plurality of mold cavities from a common source and yet prevent undue retention of the thermosetting material along any individual path prior to reaching a respective mold cavity where the delay may exceed the pot life of the thermosetting resin.

SUMMARY OF THE INVENTION

According to the invention and distinguishing the apparatus of the invention from earlier efforts, a buffer vessel is provided between a source of thermosetting material and its pumping means and the mold system which preferably includes a plurality of molds but can also be a single mold, this buffer vessel having an inlet connected to the pumping means and an outlet connected to the mold cavity, the inlet having a cutoff valve and the buffer vessel being formed with a movable wall, e.g. a piston or plunger, whose position determines the volume of a buffer compartment formed between the inlet and the outlet.

Unlike other systems in which dead zones can arise, this arrangement detects the minimum-volume state of the compartment by means of a sensor responsive to the position of the wall and operates the control means for the valve or group of valves and the pumping means so as to guarantee that the rate of flow through the buffer vessel of the thermosetting resin will be such that the residence time of the material in the path between the pumping means and the mold cavity or mold cavities will lie below the pot life of the mixture.

According to the invention, therefore, the sensor can operate an acoustic or optical signal to alert the operator that a switchover or control modification is required or can act directly upon automatic control means for this purpose.

The apparatus in one aspect also includes a sensor for the position of the wall in its maximum-volume position, this sensor also operating into the control system. In an alternative, the sensor for the maximum-volume position is eliminated but the maximum-volume position of the wall is established by metering the synthetic resin into compartments when the valve is open and after the minimum-volume position has been reached in a predetermined quantity.

These objects are attained according to the instant invention in a system where the fluent castable material is fed to at least one substantially close buffer compartment that is pressurized at a predetermined pressure. Thence the material is conducted into the mold or mold cavities. Means is provided to detect the content inside the buffer compartment between a predetermined minimum content and a predetermined maximum content. This last-mentioned means operates the pump and/or valves at the intakes of the buffer compartments. Thus, for instance, when any of the compartments is at or below the minimum content the pump will be operated, and when the compartment is at the maximum content the pump will be stopped. It is also possible to use the minimum control content switches to operate the pumps, and to use the maximum control content switches to stop the pumps and to close the valves of the intakes of the compartments. In this manner it is possible to operate almost continuously.

The buffer vessels permit the molding velocity to be independent from the pumping pressure and pumping velocity, again facilitating continuity in molding.

With the system according to the instant invention the neccessity of operating the pump continuously to maintain pressure in the molds during the molding operation is eliminated. Each buffer compartment serves to pressurize the respective mold and to supply material to it to compensate for shrinkage caused by chemical reaction during the molding operation.

The system of the present invention as described above can be contrasted with a system operating with thermoplastic synthetic resins as described, for example, in U.S. Pat. No. 3,847,525. This latter arrangement is not capable of handling thermosetting resins with limited pot life because dead zones are invariably present in the system of the patent and at these dead zones hardening can occur to render the device useless.

The apparatus of the present invention thus differs not only in application from that of U.S. Pat. No. 3,847,525 but also, most significantly, in the provision of a sensing means or unit which can detect the degree of filling of the buffer vessel or compartment. It is thus possible to monitor the throughput in each of the buffer vessels so that, if necessary, the throughput can be increased when danger threatens that the so-called pot life (the time during which the mixture remains liquid and whereafter irreversible hardening occurs) will be exceeded. Thus a principal purpose of the invention is to prevent hardening of the resin in the apparatus, a problem which does not and cannot arise in U.S. Pat. No. 3,847,525.

Each of the buffer compartments according to this invention has a rigid housing one wall of which is formed by a diaphragm or piston that is displaceable to increase and decrease the volume of the buffer compartment. The side of the deflectable wall that is turned away from the compartment is itself exposed in another compartment which is pressurized by a liquid and/or gas at a pressure determined in accordance with the type of resin being molded, the pressure needed in the mold, and other similar requirements. The position of this wall is detected by a pair of limit switches which therefore respectively determine the maximum and minimum content.

While the preferred and best mode embodiment of the present invention utilizes individual sensors for the maximum-volume states of the compartments and positions of the walls, which may be pistons and which are operated by fluid-pressure means such as pressurized liquid or a compressed gas such as air, it is also possible to operate with only a single sensor (minimum sensor) when, after this sensor is activated or tripped, a predetermined quantity of the thermosetting resin is fed to the buffer vessel.

This can be effected, for example, by means of a so-called constant displacement pump which displaces a given volume for each stroke. Alternatively, a continuous constant-rate pump, such as a gear pump, can be driven for a predetermined time period. In this case, the maximum-volume state is established by supplying a predetermined volume of the resin to each buffer vessel when the actuation of the minimum-volume sensor signals that the wall has reached the minimum-volume position.

In the present invention, as in earlier systems, molds are maintained at or are brought to a relatively high temperature to prompt setting of the resin and the reaction of the components thereof. It has been found to be advantageous in such systems to provide means for maintaining the portions of the system between the pumping means and the relatively hot molds at a lower temperature than that of the molds, thereby reducing the reaction rate within the mixture and making use of the phenomenon that thermosetting resin mixtures will remain flowable longer in a relatively cool state than in a relatively warm state. To this end, cooling means can be provided for the resin pathways between the pumping means and the molds while heating means can be provided for the molds.

The control means of the present invention, i.e. the means responsive to the sensor or both sensors can include electronic logic circuitry for monitoring the duration for which the valve at the inlet of each buffer vessel should be maintained open. When there is danger that the pot life might be exceeded because of the slow displacement of the resin or the delay in passage of the resin or excessive accumulation of the resin in the buffer vessel, the automatic control permits additional resin to be pumped into the vessel and any excess discharged through resin-relief valves which are provided in the vessel in accordance with a feature of this invention.

In other words each of the buffer vessels is additionally provided with an overflow or relief valve intended, even after the maximum-volume state is reached, to permit fresh thermosetting resin to be forced into the buffer vessel and the material which may have been retained therein for an excessive period to be discharged through the overflow valve so as to preclude setting in this vessel.

The other functions discussed above are likewise provided by this control means.

The automatic control also monitors the supply of the resin to the buffer vessels during normal operations and can respond to unusual conditions to effect any necessary corrections.

BRIEF DESCRIPTION OF THE DRAWING

FIG. 1 is a schematic view illustrating a supply means for the system according to this invention;

FIG. 2 is a schematic diagram of a system according to this invention;

FIG. 3 is a large-scale schematic view of a detail of the system of FIG. 2; and

SPECIFIC DESCRIPTION

Figure 4:
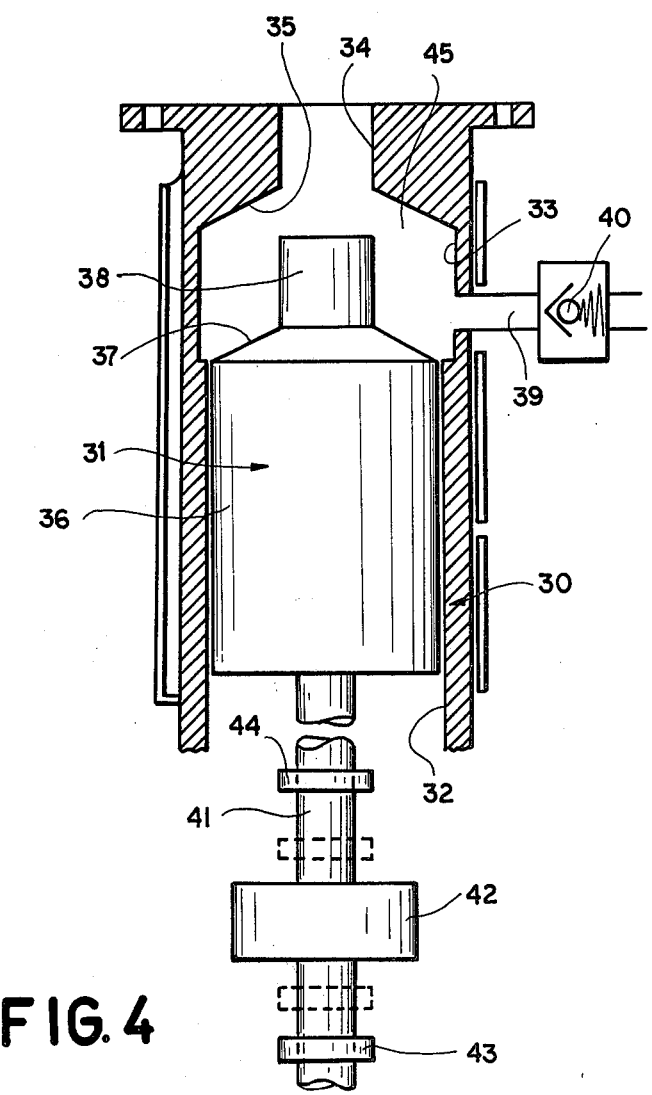
FIG. 4 is an axial cross-sectional view through a pump of the pumping means of the present invention.

As is shown in FIG. 1 flowable reactive thermosetting synthetic resin material is fed to a conduit 13 from a mixing chamber 12 by means of an integral pump 1 such as described in my above-cited copending application which is so constructed that it has an intake volume per stroke which is greater than the output volume per stroke. In this manner depositing or sedimentation of the material between chamber 12 and pump 1 is avoided.

FIG. 2 shows how instead of a single chamber 12 a pair of chambers 4 and 5 holding respective components are provided with respective dosing pumps 6 and 6' whose outputs respectively feed to a final mixer 7 having an outlet conduit 13'. A manifold 14 is connected on one side to this outlet conduit 13' and may be alternatively connected to the conduit 13. The other side of this manifold 14 is connected to the inlets 8 of four identical buffer compartments 3a-3d having outlets 17 connected to respective molds 2a-2d whose cavities can be of different sizes and configurations.

In FIG. 2 I have also shown at C a means for maintaining a relatively low temperature, which can encompass the region D of the apparatus between the pumping means and the mold means, the latter being represented at M and being provided with means H for maintaining a relatively higher temperature, both the heating and cooling means and H being shown only diagrammatically because they can be any conventional system in the mold heating or cooling arts such as circulating heating or cooling fluids.

In addition, each of the lines 17 is shown to be provided with a pressure-relief or overflow valve 21a through 21d serving as emergency valves for discharging the thermosetting resin when the control system 18 has detected a flow rate (from the respective sensors 11', 11") indicating a delay in displacement of the thermosetting resin beyond the pot life. The control thereupon maintains the valves 9 open for the corresponding buffer vessel and induces the pumping means 6', 7 to force additional resin into the buffer vessels, thereby driving out any of the excessively retained resin which might prematurely set, this resin being vented by the emergency valves.

As shown in FIG. 3 the compartment 3a has at its inlet 8 a valve 9 which may be a standard check valve, a manually closeable valve, or a solenoid-operated valve. Furthermore, each compartment 3 has one wall formed by a piston 16 having a stem 20 that extends out of the compartment 3 and that can close either of two limit switches 11' and 11". The chamber inside the compartment 3 to the back of the piston 16 is pressurized via connection 10 from a source 19 of liquid and/or gas, e.g. air.

The switches 11' and 11" are connected to a controller 18 which is also connected to the pumps 6 and 6' or the pump 1, and preferably also to the valves 9.

In use the pump 1 or the pumps 6 and 6' force the flowable reactive thermosetting synthetic-resin material through the manifold 14 into the compartments 3a-3d and thence into the molds 2a-2d. The pumps 1, 6, and 6' operate in strokes.

As the compartments 3a-3d are filled the respective wall or piston 16 is pushed back against the air inside it, first closing the switch 11" and then closing the switch 11'. Closing of the switch 11' may be effective through the controller 18 to close the respective inlet valve 9, and the pump 1 or the pumps 6 and 6' will be shut down. If the content in any one of the compartments 3a-3d drops so low that the respective switch 11" is opened, valve 9 will be opened and the pump or pumps are started up again. After filling of the molds a constant pressure is maintained on the body of the material in each of the molds by the cushion inside each of the compartments 3a-3d. At the time the pumps 1, 6, and 6' need not be pressurized so that these elements of the system are not under any strain and therefore no leakage in the pumps is possible.

The pump 1 (FIG. 1) or the pumps 6 and 6' (FIG. 2) can have the construction shown in FIG. 4. The pump of FIG. 4 comprises a cylinder 30 receiving a piston 31 and having a first bore section 32 and a second bore section 33 axially spaced from one another.

Section 32 is connected by a frustoconical transition section 35 with the intake bore 34.

The diameter of the section 33 is slightly larger than that of section 32 while the diameter of the bore 34 is substantially smaller than that of the two other sections 32 and 33.

The piston 31 has three axially spaced sections 36, 37, 38. Section 36 corresponds to the bore section 31 and the section 38 is a plug corresponding in diameter to that of the bore 34. Section 37 is a frustoconical surface which can correspond and be complementary to the section 35.

A pressure line 39 extends out of the cylinder 33 and contains a spring-biased check valve 40

The piston 31 is connected to a piston rod 41 which, in turn, is connected to an actuator 42 such as a fluid pressure cylinder, the piston rod being formed with abutments 43 and 44 which enable the stroke of the piston to be varied.

The pump in FIG. 4 is shown at the end of its suction stroke. When the upward or pressure stroke is initiated, the synthetic resin is displaced from the chamber 45 when the plug 38 blocks the bore 34, thereby forcing the resin past the check valve 40 through line 39 which can correspond to the line 13 in FIG. 1 or either of the lines running to the mixing chamber 17. Simultaneously the mass in the bore 34 is pressed out. During the suction stroke an initial reduced pressure is generated in chamber 35 so that, when the plug 38 clears the bore 34, the latter suddenly opens to draw the resin or component thereof sharply into the chamber 35. The intake volume is thus significantly larger than the displaced volume so that the resin in the bore 34 and in ducts connected therewith moves in both directions, thereby avoiding sedimentation and the accumulation of the resin mass on the walls of the intake lines.

It has been found to be advantageous to dimension the buffer vessels so that after the movable wall reaches its minimum volume position, additional synthetic resin material can be supplied from the buffer vessel to the respective mold cavity. This can be achieved by positioning the sensor so that it signals the minimum-volume state before the compartment is fully emptied.

When a plurality of buffer vessels are used such as has been illustrated in FIG. 2, the valves 9 can be made so that they close in both directions, i.e. that these valves are bidirectional. This permits the filling of the buffer vessels 3a through 3d independent of one another. When one of the vessels need not be refilled, its valve can remain closed. When a single buffer vessel is provided, a simple check valve can be provided to admit the resin mass into the buffer vessel but prevent backflow to the pump.

The means for maintaining a lower temperature in the portion of the apparatus D apart from the molds M is represented diagrammatically at 50 and controls the cooling means C and the heating means H.

The sensors 11 and 11' can operate at least one device from a group which includes an optical signal device 51 and an acoustic signal 52 alerting the operator, as well as the automatic control device 18. The automatic control device, of course, is responsive to the sensor for detecting the minimum volume state for opening the valve and starting the pumping means and maintenance, in dependence upon the settings of at least one valve of another vessel based upon the valve state input 53. The means enabling control of the throughput generates an alert signal at 54 upon the danger of retention of the resin in the vessel beyond the port life of the resin.

I claim:

1. An apparatus for feeding at least one mold with a thermosetting synthetic resin comprising:
   supply receptacle means including at least one supply receptacle constituting a source of the thermosetting synthetic resin;
   pumping means including at least one pump connected to said source for delivering the thermosetting synthetic resin at an output side of said pump means; and
   means connecting said output side of said pumping means to each such mold, said connecting means including
   a respective buffer vessel between each mold and said output side of said pumping means, each buffer vessel having an inlet connected with said output side and an outlet connected with the respective mold whereby the thermosetting synthetic resin in a reactive state passes through a compartment in the respective vessel before entering the respective mold,
   a respective valve at each of said inlets for shutting the respective compartment off from said pumping means,
   a shiftable respective wall in each vessel,
   fluid-pressure means for displacing each wall to vary the volume of the compartment defined by the respective wall and traversed by the thermosetting synthetic resin between the respective inlet and outlet,
   a first sensor responsive to the position of said wall for detecting a minimum-volume state of the respective compartment,
   a second sensor responsive to the position of said wall for detecting a minimum-volume state of said compartment, and
   means responsive to said sensors for control of at least one of said pumping means and said valve to regulate the throughput of the respective vessel.

2. An apparatus for feeding at least one mold with a thermosetting synthetic resin comprising:
   supply-receptacle means including at least one supply receptacle constituting a source of the thermosetting synthetic resin;
   pumping means including at least one pump connected to said source for delivering the thermosetting synthetic resin at an output side of said pump means; and
   means connecting said output side of said pumping means to each such mold, said connecting means including
   a respective buffer vessel between each mold and said output side of said pumping means, each buffer vessel having an inlet connected with said output side and an outlet connected with the respective mold whereby the thermosetting resin in a reactive state passes through a compartment in a respective vessel before entering the respective mold, a respective valve of each of said inlets for shutting the respective compartment off from said pumping means,
   a respective shiftable wall in each vessel,
   fluid-pressure means for displacing each wall to vary the volume of the compartment defined by the respective wall and traversed by the thermosetting synthetic resin between the respective inlet and outlet,
   a sensor responsive to the position of said wall for detecting a minimum-volume state of the respective compartment, the pumping means being constructed and arranged to fill the respective compartment with a predetermined quantity of said resin and thereby the position of said wall in a maximum-volume state of the respective compartment is reached, and
   means responsive to said sensor for control of at least one of said pumping means and said valve to regulate the throughput of the respective vessel.

3. The apparatus defined in claim 1 or claim 2 wherein the means responsive to said sensors includes at least one device from a group which includes an optical signal device for alerting an operator, an acoustic signal device for alerting said operator and an automatic control device regulating at least one of said pumping and connecting means.

4. The apparatus defined in claim 3 wherein said means for enabling control of the throughput includes an automatic control device responsive to the sensor detecting said minimum-volume state for opening said valve and starting said pumping means immediately or retarded in dependence upon the settings of at least one valve of another vessel and for maintaining the respective valve open until the maximum-volume state of this respective vessel is reached and for stopping the pumping means at said maximum-volume state.

5. The apparatus defined in claim 3 wherein said means for enabling control of the throughput generates an alert signal upon the danger of the retention of the resin in said vessel beyond the pot life of the resin.

6. The apparatus defined in claim 1 or claim 2 wherein the molds are provided with heating means for operating each of said molds at an elevated temperature, said apparatus further comprising means for maintaining a lower temperature in portions of said apparatus apart from said molds.

7. The apparatus defined in claim 1 or claim 2 wherein said means responsive to said sensors includes a safety valve connected to each vessel for discharging a respective quantity of resin from the respective compartment upon the danger of retention in said compartment of a quantity of resin beyond the pot life thereof.

8. The apparatus defined in claim 1 or claim 2 wherein said pumping means includes an intake side provided with a filler body connected with a pumping piston and having a smaller cross section than said piston and adapted to be pressed into an intake opening to displace resin therefrom.

9. The apparatus defined in claim 1 or claim 2 wherein said supply-receptacle means includes at least two receptacles each containing a respective component of the thermosetting synthetic resin and reactive with the other component, said pumping means including a respective metering pump associated with each supply receptacle and having an outlet, and a mixer connected to both of said metering pumps and communicating with said connecting means.

10. The apparatus defined in claim 1 or claim 2 wherein the sensor responsive to the minimum-volume state of the respective compartment senses a state which is greater than the smallest volume possible in the respective compartment.

11. The apparatus defined in claim 1 or claim 2 wherein a plurality of buffer vessels is provided each with a respective one of said valves, each of said valves is a bidirectionally closing cutoff valve.

12. The apparatus defined in claim 1 or claim 2 wherein a single buffer vessel is provided, said valve is a blocking valve disposed at least to block the reverse flow of said resin toward said pumping means.

* * * * *